(12) United States Patent
Chen

(10) Patent No.: US 8,553,413 B2
(45) Date of Patent: Oct. 8, 2013

(54) FAN MOUNTING APPARATUS FOR HEAT DISSPATION

(75) Inventor: Yun-Lung Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 140 days.

(21) Appl. No.: 13/328,021

(22) Filed: Dec. 16, 2011

(65) Prior Publication Data

US 2012/0292479 A1 Nov. 22, 2012

(30) Foreign Application Priority Data

May 20, 2011 (CN) .......................... 2011 1 0131652

(51) Int. Cl.
*H05K 7/20* (2006.01)

(52) U.S. Cl.
USPC ................. 361/695; 361/679.48; 403/353

(58) Field of Classification Search
USPC ..... 248/672; 312/223.2; 403/353; 361/695, 361/679.48; 52/539
See application file for complete search history.

(56) References Cited

U.S. PATENT DOCUMENTS

| | | | | | |
|---|---|---|---|---|---|
| 3,071,400 | A | * | 1/1963 | Bellock | 211/206 |
| 4,496,262 | A | * | 1/1985 | Sangster | 403/335 |
| 4,834,615 | A | * | 5/1989 | Mauch et al. | 415/213.1 |
| 5,044,988 | A | * | 9/1991 | Hirayama | 439/571 |
| 5,350,250 | A | * | 9/1994 | Nagler | 403/316 |
| 5,498,130 | A | * | 3/1996 | Wakley et al. | 415/213.1 |
| 5,878,621 | A | * | 3/1999 | Vadin-Michaud | 74/7 A |
| 6,018,920 | A | * | 2/2000 | Fancher | 52/582.2 |
| 6,478,284 | B2 | * | 11/2002 | Qiu | 248/680 |
| 6,540,557 | B1 | * | 4/2003 | Yu | 439/607.33 |
| 6,554,527 | B1 | * | 4/2003 | O'Donnell et al. | 403/353 |
| 6,722,807 | B1 | * | 4/2004 | Cornet et al. | 403/2 |
| 6,817,939 | B2 | * | 11/2004 | Gan et al. | 454/184 |
| 7,021,906 | B2 | * | 4/2006 | Chang | 417/360 |
| 7,145,771 | B2 | * | 12/2006 | Wang | 361/695 |
| 7,494,408 | B2 | * | 2/2009 | Chen et al. | 454/184 |
| 7,599,179 | B2 | * | 10/2009 | Chen et al. | 361/679.48 |
| 7,654,792 | B2 | * | 2/2010 | Kikuichi et al. | 415/68 |
| 7,826,209 | B2 | * | 11/2010 | Chen et al. | 361/679.37 |
| 8,051,626 | B2 | * | 11/2011 | Ubinana Felix | 52/848 |
| 8,118,377 | B2 | * | 2/2012 | Chen et al. | 312/223.2 |
| 8,206,103 | B2 | * | 6/2012 | Sun | 415/213.1 |
| 8,484,924 | B2 | * | 7/2013 | Braun | 52/588.1 |
| 2002/0060900 | A1 | * | 5/2002 | Qiu | 361/683 |
| 2007/0171612 | A1 | * | 7/2007 | Chen et al. | 361/695 |
| 2009/0168326 | A1 | * | 7/2009 | Chen et al. | 361/679.39 |
| 2012/0305744 | A1 | * | 12/2012 | Chen et al. | 248/672 |
| 2012/0305745 | A1 | * | 12/2012 | Chen et al. | 248/672 |
| 2012/0318953 | A1 | * | 12/2012 | Tsai et al. | 248/638 |
| 2012/0320522 | A1 | * | 12/2012 | Chen et al. | 361/679.48 |
| 2012/0322359 | A1 | * | 12/2012 | Chen et al. | 454/341 |

* cited by examiner

*Primary Examiner* — Terrell McKinnon
*Assistant Examiner* — Daniel J Breslin
(74) *Attorney, Agent, or Firm* — Altis & Wispro Law Group, Inc.

(57) ABSTRACT

A fan mounting apparatus includes a case and a fan. The case includes a bottom plate and a rear plate substantially perpendicular to the bottom plate. A clipping member extends to an interior of the rear plate in a first direction. The fan includes a sidewall with a securing portion. An extending direction of the securing portion is substantially perpendicular to the first direction. The securing portion includes a protruding surface. The securing portion is engaged with the clipping member, and the protruding surface abuts the clipping member.

10 Claims, 5 Drawing Sheets

FAN MOUNTING APPARATUS FOR HEAT DISSPATION

BACKGROUND

1. Technical Field

The present disclosure relates to fan mounting apparatuses, more particularly to a fan mounting apparatus for a computer system.

2. Description of Related Art

In a working computer system, a large amount of heat may be generated from electrical elements of the computer system. A fan is often used as a conventional means to dissipate the heat from the computer system. Typically, a bracket is provided for receiving a fan, and a plurality of screws may be used to install the fan to the bracket. However, in such a mounting configuration, assembling and disassembling of the fan may be inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
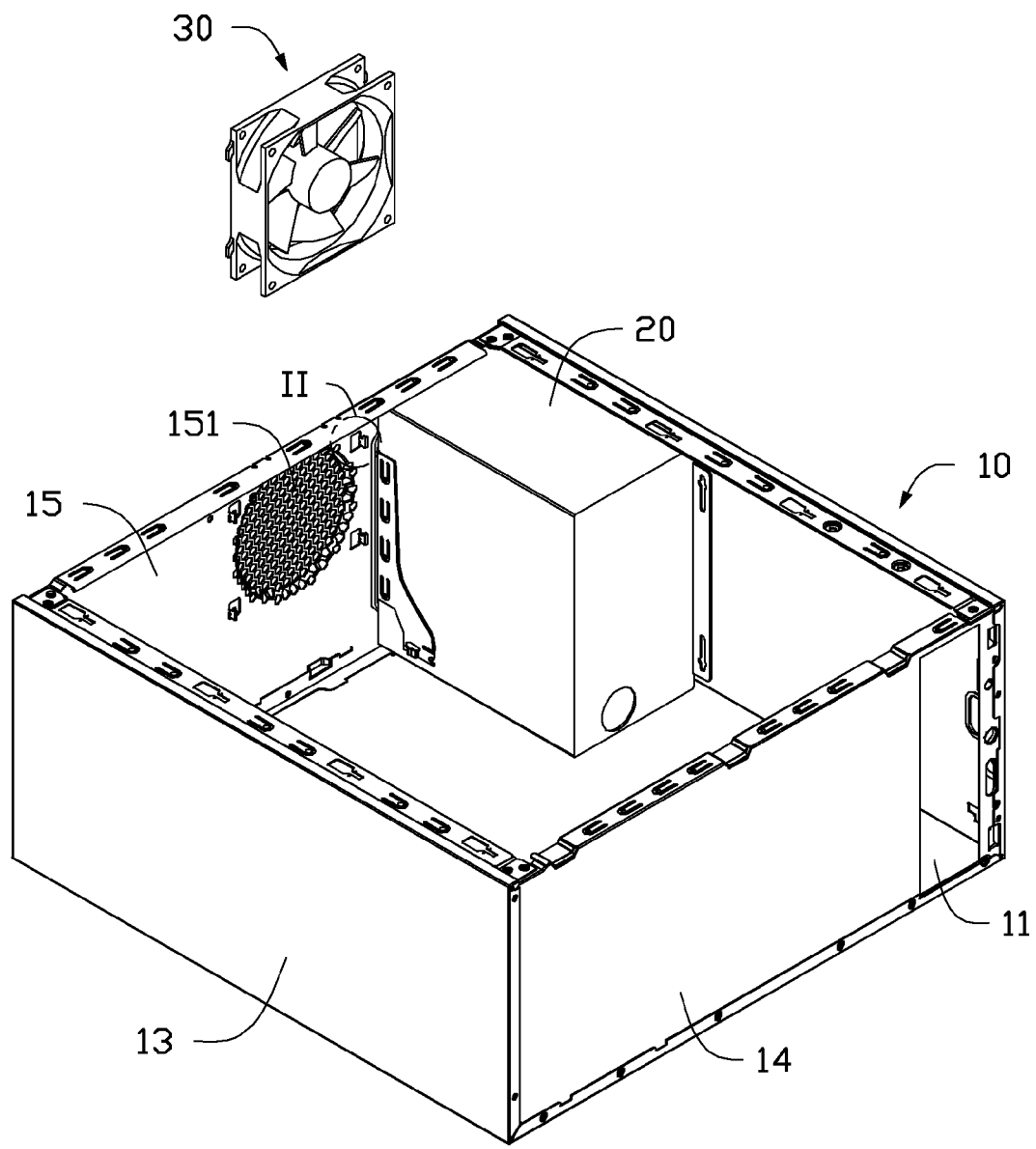
FIG. 1 is an exploded, isometric view of a fan mounting apparatus in accordance with an embodiment.
Figure 2:
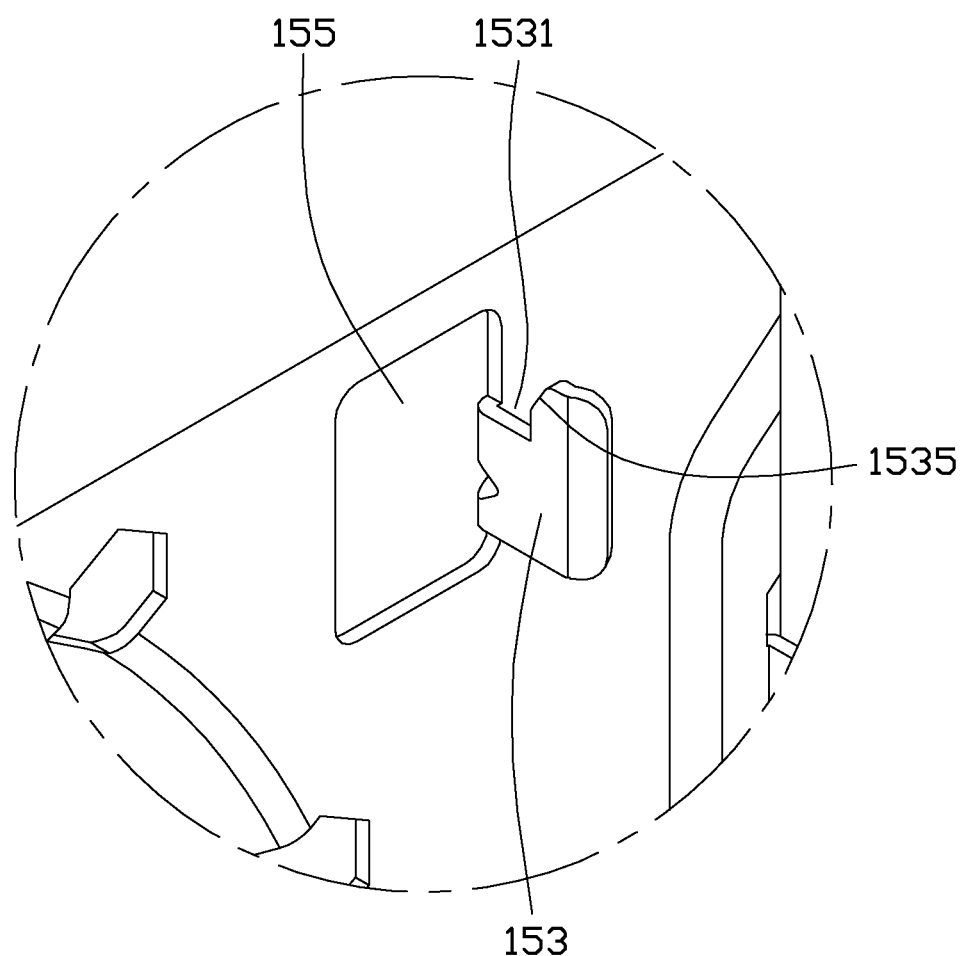
FIG. 2 is an enlarged view of circled portion II of FIG. 1.

Referring to FIGS. 1 and 2, a mounting apparatus in accordance with an embodiment comprises a case 10 and a fan 30 received in the case 10.

The case 10 comprises a bottom plate 11, two side plates 13 connected to opposite edges of the bottom plate 11, having a front plate 14 and a rear plate 15 connected to other opposite edges of the bottom plate 11. In one embodiment, the rear plate 15 is substantially perpendicular to the bottom plate 11.

A power supply 20 is attached to the bottom plate 11 and arranged at a corner between the rear plate 15 and one of the two side plates 13. A plurality of ventilation holes 151 is defined in the rear plate 15. In one embodiment, the plurality of ventilation holes 151 is arranged as a rectangle and adjacent to the power supply 20. Four clipping members 153 are located on the rear plate 15 and extend to an interior of the case 10. In one embodiment, the four clipping members 153 are arranged to the four corners of the rectangle formed by the plurality of ventilation holes 151, and each clipping member 153 is substantially perpendicular to the rear plate 15.

Each clipping member 151 defines a clipping slot 1531. In one embodiment, the clipping slot 1531 is adjacent to the rear plate 15. A slanted surface 1535, towards the clipping slot 1531, is defined in the clipping member 153. In one embodiment, the rear plate 11 defines four openings 155, and each clipping member 153 extends from a side edge of each opening 155.

Figure 3:
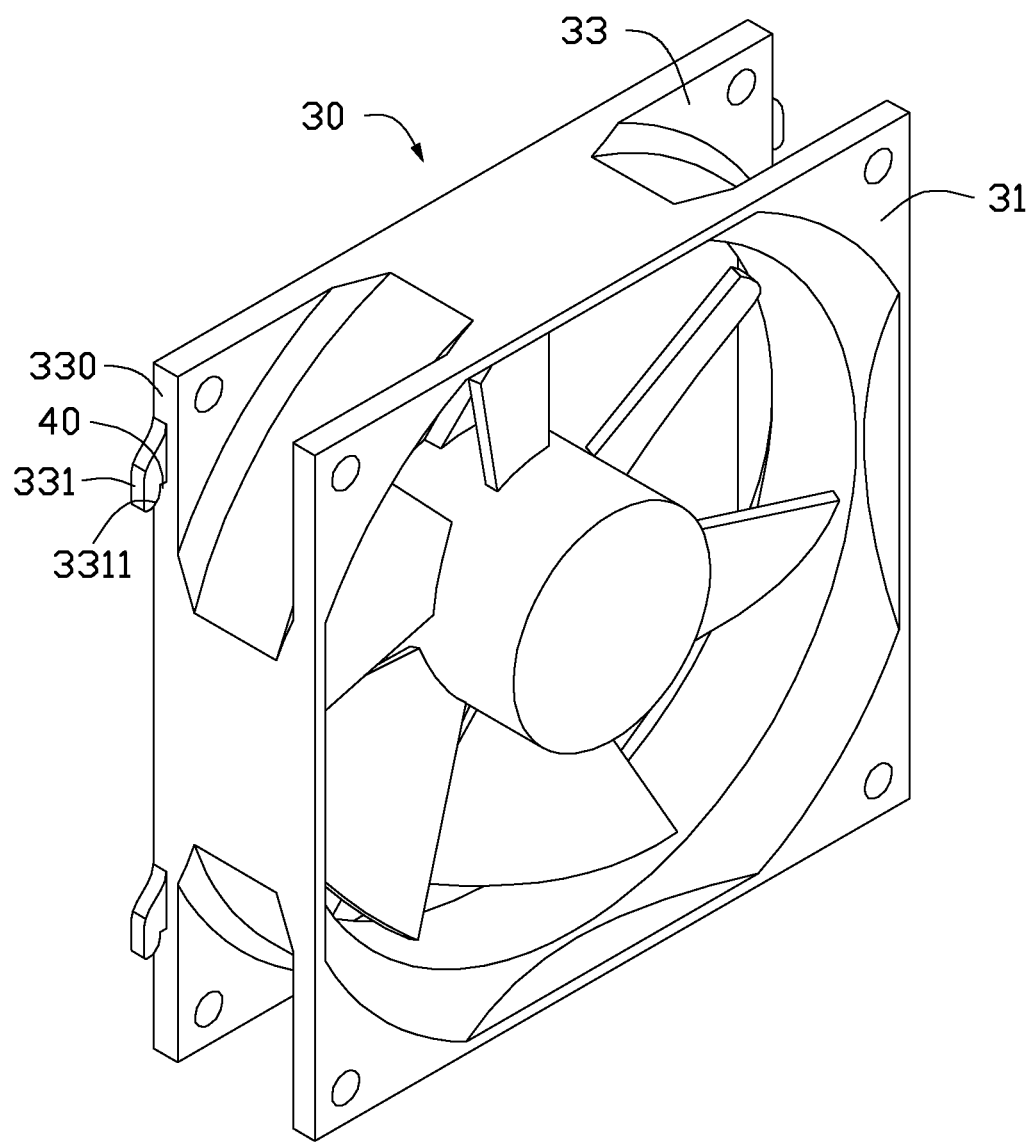
FIG. 3 is an isometric view of a fan of FIG. 1.

Referring to FIG. 3, the fan 30 includes a first sidewall 31 and a second sidewall 33 opposite to the first sidewall 31. The second sidewall 33 includes two opposite side edges 330. Two parallel securing portions 331 extend from each side edge 330, so that each securing portion 331 and the second sidewall 33 are located on the same plane. A receiving gap 40 is defined between each securing portion 331 and the side edge 330. A protruding surface 3311 is defined in each securing portion 331. In one embodiment, the protruding surface 331 is arcuate and communicates with the receiving gap 40.

Figure 4:
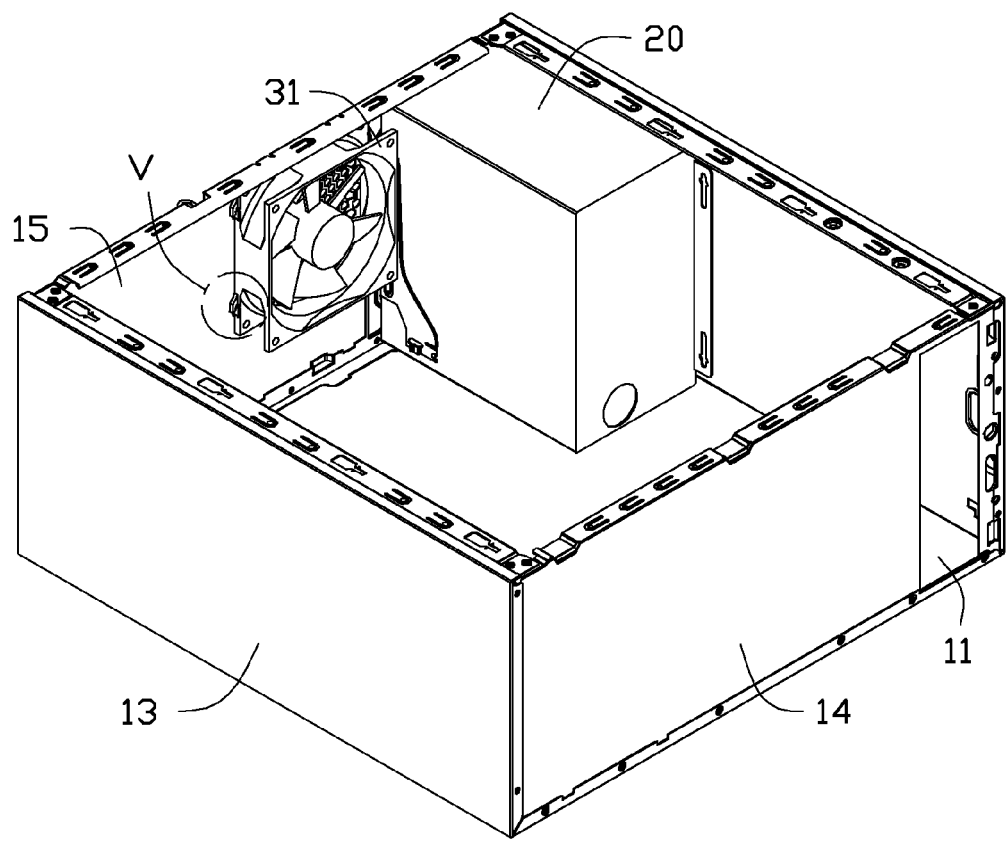
FIG. 4 is an assembled view of FIG. 1.
Figure 5:
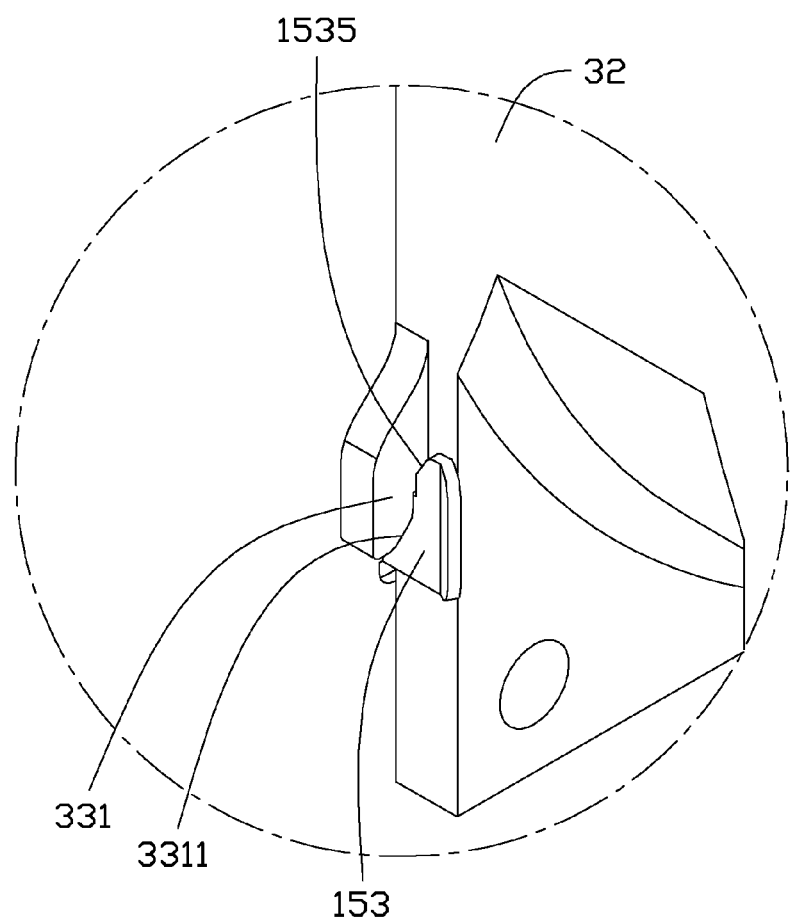
FIG. 5 is an enlarged view of circled portion V of FIG. 4.

Referring FIGS. 4-5, in assembly, the fan 30 is aligned with the plurality of ventilation holes 151. Each securing portion 331 is slid into each clipping slot 1531 via each slanted surface 1535, so the fan 30 can be secured on the rear plate 15. When the fan 30 is secured to the rear plate 15, each clipping member 153 is received in each receiving gap 40, so that the clipping member 153 is positioned between the securing portion 331 and the second sidewall 33. An extending direction of the securing portion 33 is substantially perpendicular to that of the clipping member 153. The protruding surface 311 abuts an outside surface of the clipping member 153.

In disassembly, the fan 30 is moved upwardly away from the bottom plate 11. Each protruding surface 311 moves along the outside surface of the clipping member 153, until the securing portions 331 are disengaged from the clipping slot 1531. Therefore, the fan 30 can be detached from the rear plate 15. The present embodiment of a fan assembly makes it easier to install and remove the fan 30 from the case 10, thus saving time and related work loss from the extra down time that is needed to remove and add the screws.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A fan mounting apparatus comprising:
   a case comprising a bottom plate and a rear plate substantially perpendicular to the bottom plate, a clipping member extending toward an interior of the rear plate in a first direction;
   a fan comprising a sidewall, the sidewall comprising a securing portion; an extending direction of the securing portion being substantially perpendicular to the first direction, and the securing portion comprising a protruding surface;
   wherein the securing portion is engaged with the clipping member, and the protruding surface abuts the clipping member, for allowing the sidewall to attach to the rear plate;
   wherein a receiving gap is defined between the securing portion and the sidewall, and the clipping member is received in the receiving gap to be positioned between the securing portion and the sidewall; and
   wherein the clipping member comprises a clipping hole, and the securing portion is engaged in the clipping hole.

2. The fan mounting apparatus of claim 1, wherein the securing portion and the sidewall are located at a same panel.

3. The fan mounting apparatus of claim 1, wherein the clipping member comprises a slanted surface slanting towards the clipping hole, and the slanted surface is adapted to guide the securing portion to slide into the clipping hole.

4. The fan mounting apparatus of claim 1, wherein the clipping member is substantially perpendicular to the rear plate.

5. The fan mounting apparatus of claim 1, wherein the rear plate defines an opening, and the clipping member extends from an edge of the opening.

6. A fan mounting apparatus comprising:
a case comprising a bottom plate and a rear plate substantially perpendicular to the bottom plate; a plurality of ventilation holes defined in the rear plate; at least two clipping members located on an inner surface of the rear plate and around the plurality of ventilation holes;
a fan comprising a sidewall attached to the rear plate, and the sidewall substantially parallel to the rear plate; the sidewall comprising at least two securing portions, the at least two securing portions extending from opposite side edges of the sidewall, and each securing portion comprising a protruding surface;
wherein an extending direction of each securing portion is substantially perpendicular to that of each clipping member, the securing portion is engaged with the clipping member, and the protruding surface abuts the clipping member;
wherein a receiving gap is defined between the securing portion and the sidewall, and the clipping member is received in the receiving gap to be positioned between the securing portion and the sidewall;
wherein the clipping member comprises a clipping hole, and the securing portion is engaged in the clipping hole.

7. The fan mounting apparatus of claim 6, wherein each securing portion and the sidewall are located at the same panel.

8. The fan mounting apparatus of claim 6, wherein each clipping member comprises a slanted surface slanting towards the clipping hole, and the slanted surface is adapted to guide the securing portion to slide into the clipping hole.

9. The fan mounting apparatus of claim 6, wherein each clipping member is substantially perpendicular to the rear plate.

10. The fan mounting apparatus of claim 6, wherein the rear plate defines at least two openings, and each clipping member extends from an edge of each opening.

* * * * *